United States Patent [19]
Henderson et al.

[11] Patent Number: 5,714,927
[45] Date of Patent: Feb. 3, 1998

[54] METHOD OF IMPROVING ZONE OF COVERAGE RESPONSE OF AUTOMOTIVE RADAR

[75] Inventors: Mark Ford Henderson, Kokomo; Michael John Shorkey, Noblesville, both of Ind.; David James Lee, Clover, S.C.; Thomas Hays Savchick, Noblesville, Ind.

[73] Assignee: Delco Electronics Corporation, Kokomo, Ind.

[21] Appl. No.: 762,090

[22] Filed: Dec. 9, 1996

[51] Int. Cl.⁶ .................................................. B60Q 1/00
[52] U.S. Cl. ........................ 340/435; 340/903; 367/909
[58] Field of Search ............................ 340/435, 903, 340/904, 901, 905; 348/148, 149; 342/42; 180/167; 367/909

[56] References Cited

U.S. PATENT DOCUMENTS

| | | | |
|---|---|---|---|
| 5,313,335 | 5/1994 | Gray et al. | 340/903 |
| 5,349,430 | 9/1994 | Yamamoto et al. | 180/167 |
| 5,521,579 | 5/1996 | Bernhard | 340/901 |
| 5,530,447 | 6/1996 | Henderson et al. | 342/70 |
| 5,538,495 | 7/1996 | Ben Lulu | 340/904 |
| 5,594,412 | 1/1997 | Matsumoto | 340/903 |

OTHER PUBLICATIONS

"Visual Indicator for a Commercial Side Detection System," Research Disclosure #37024, Feb. 1995.

*Primary Examiner*—Jeffery Hofsass
*Assistant Examiner*—Anh La
*Attorney, Agent, or Firm*—Jimmy L. Funke

[57] ABSTRACT

Side detection radar utilized on a host vehicle for covering a blind spot in a vehicle mirror view produces alert commands resulting in signals which have gaps due to poor radar reflectivity of portions of a target. To fill these gaps to produce a steady alert signal when a target vehicle is in radar view and to extend the perceived zone of coverage, a variable sustain time is added to each alert signal which exceeds a threshold value. The sustain time varies as an inverse function of the relative vehicle speed and the threshold value varies as an inverse function of vehicle speed. If the alert signal is shorter than the threshold value, then a minimized hold time can be applied.

12 Claims, 3 Drawing Sheets

METHOD OF IMPROVING ZONE OF COVERAGE RESPONSE OF AUTOMOTIVE RADAR

FIELD OF THE INVENTION

This invention relates to the control of side detection automotive radar systems and particularly to a method of controlling an alarm or alert indicator to enhance the perceived coverage of a blind spot.

BACKGROUND OF THE INVENTION

Vehicle mounted near object detection systems utilize various means for detecting and identifying targets of interest in their vicinity. The target information is useful in collision warning systems wherein the system notifies the vehicle operator that an object is positioned to present collision potential. While many forms of near object detection systems presently exist, generally those utilizing radar transceivers and related signal processing techniques do the best job of reliably detecting targets within range over variations in environment.

Such near object detection systems use radar, preferably microwave radar, to "illuminate" a target of interest by transmitting energy with certain signatory characteristics and then monitoring for similar return signals reflected from an object. Microwave transmissions with approved power levels and spectra generally experience lower overall attenuation with weather and are less susceptible to "scattering" effects than are other transmission media utilized by systems of this type. Properties of the reflected signal are analyzed using established (proprietary) techniques to determine relevance to the interests of the driver of a vehicle equipped with such a system. Information derived from the returned radar signals include target range and range rate. Using platform or host vehicle speed as a system input and as a reference, target data can be analyzed and the signal processor can make reasonable decisions whether to "report" the target or not. Accurate target discrimination capabilities are required of such systems to reduce "false alarms" which are an annoyance to the driver in collision warning system scenarios. The source of such false alarms can be clutter or radar reflections from roadside objects such as guard rails, walls or other stationary objects.

Another source of annoyance is alert dropout (the signal light or audio turns off) occurring due to variable reflectivity of a target vehicle and its effect on the strength of the return radar signal. A vehicle wheel well, for example, may help create a weak return signal and subsequently an alert dropout. Dropouts are most common during station-keeping events where the host and target vehicle travel adjacent each other at about the same velocity, and in particular when a radar collision warning sensor is directed into low reflectivity regions of a target vehicle and/or receives minimally reflected signals from the target vehicle. The clear majority of vehicular targets in near field proximity reflect radar signals across their distributed surfaces which can exceed a system's detection thresholds. However, any vehicular target has a finite probability of producing return signals with low efficiency through characteristics of absorption or random scattering. Weak return signals could fall below system detection thresholds, resulting in perceivable dropouts as seen by the driver. Higher relative velocities generally contain enough Doppler signal to exceed system thresholds; therefore dropouts on "passing targets" can be more naturally minimized than during low speed or "stationary" passing events.

Still another annoyance is an alert signal flicker which occurs when a distributed target just enters or just clears a detection zone and both reflected field strength and relative velocity decay to near zero. Variations in reflected energy may cross and recross system threshold settings, causing the alert to oscillate in an annoying manner.

SUMMARY OF THE INVENTION

It is therefore an object of the invention to improve the zone of coverage response of side detection radar. A further object is to prevent or minimize dropouts due to small reflected signals during station keeping events. Another object is to minimize annoying alert activity when passing stationary or slow moving targets.

The time of an alert signal activation is measured and compared to a threshold. The threshold can either be fixed or vary inversely with host vehicle speed. When the alert time is less than the threshold, the signal turn-off is delayed for a minimal hold time. The minimal hold time can be either a fixed value or varied intentionally with vehicle speed. The minimal hold time is generally only a fraction of a second, but in some applications it is desirable to elongate the minimal hold time as vehicle speed is increased to minimize flicker effects. When the alert time is equal to or greater than the threshold, a longer sustain time is applied to hold the signal on, and is generally sufficient to bridge the dropout periods due to low reflectivity during station keeping. The sustain time varies according to the absolute value of the relative velocity between the target and host vehicles and ranges from a fraction of a second at high relative velocity up to a few seconds at low relative velocity. This improves the zone of coverage as perceived by the vehicle driver, and can increase the perceived alert distance as well.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a vehicle radar side detection method and apparatus to cover a blind spot which is not visible to the driver in the side view mirrors. Such a system is useful for both trucks and automobiles.

Figure 1:
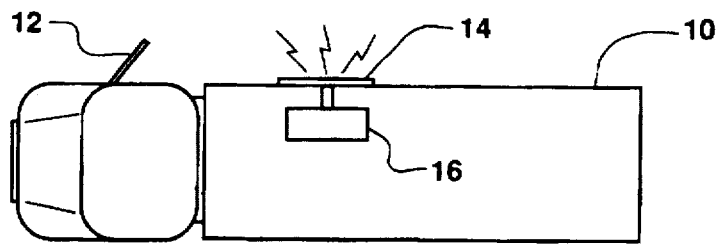
FIG. 1 is a diagram of a vehicle equipped with side detection radar.

Referring to FIG. 1, a motor vehicle 10 (herein called a host vehicle), in particular a large truck, has a side view mirror 12, and side detection radar antennae 14. The antennae are part of a side detection system 16. The side view mirror 12 provides a limited view of the lane adjoining the lane used by the host vehicle, leaving the possibility that an object is present in a blind spot. The antennae are effective to view a region to the side of the vehicle to detect another vehicle or other object (herein called the target or target vehicle) in the blind spot. The side detection system 16 senses the presence of an object in the adjoining lane via radar signals transmitted and received at the side antennae 14. The system warns the operator of such objects by warning lamps or alert signals which may be on or within the mirror 12 and/or by an audible signal.

Figure 2:
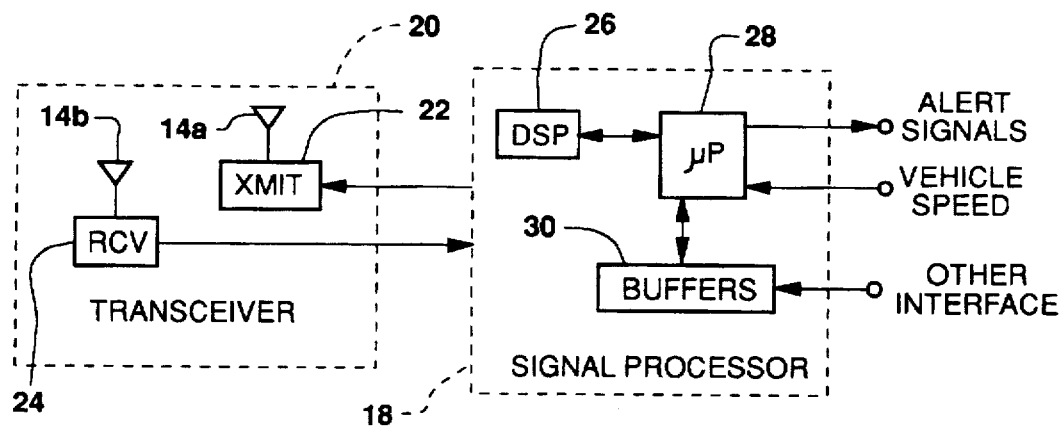
FIG. 2 is a schematic diagram of a side detection radar system for practicing the method of the invention.

FIG. 2 is a schematic diagram of the detection system 16. A signal processor 18 is coupled to a transceiver 20 so that the signal processor can control the transmission and can also receive data generated by the transceiver. The transceiver 20 includes a transmit unit 22 and a receive unit 24, each comprising a monolithic microwave integrated circuit. Transmit and receive antennae 14a and 14b are coupled to the transmit and receive units, respectively.

The signal processor 18 includes a digital signal processor (DSP) 26 connected to a microprocessor 28. A pulsed speed signal is an input to the microprocessor and other vehicle interfaces are coupled via buffers 30 to the microprocessor. An output port of the microprocessor carries an alert signal to the alert signal devices.

The speed signal comprises pulses at a frequency proportional to vehicle speed and is available from either an onboard engine control module, anti-lock brake wheel speed sensors, a separate vehicle speed supply module, or via an integrated vehicle data bus. Preferably the speed signal supplies about 4000 pulses per mile over a serial or parallel data bus. The microprocessor counts vehicle speed pulses over time and translates this into host vehicle speed. Target discrimination algorithms use the speed information in determining whether a detected object is a hazard. This is discussed in detail in U.S. Pat. No. 5,530,447 entitled "Blind-Zone Target Discrimination Method and System for Road Vehicle Radar", assigned to the assignee of this invention and which is incorporated herein by reference. The DSP 26 does the radar calculations involving targets within the system zone of coverage. The DSP measures range rate of each target, estimates range in "X" and "Y" directions from the antennae, and supplies target track information. The relative speed of the host vehicle and the target is also calculated. This information is sent to the microprocessor 28 which, knowing vehicle speed, compares data within the structure of the target discrimination algorithms and makes a decision to report "valid" targets to the operator or to not report targets which are of little interest to the operator.

Figure 3A:
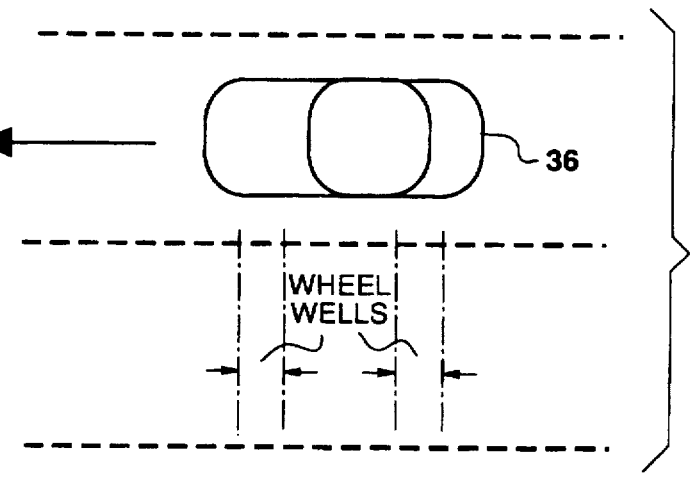
FIG. 3a is a plan view of a target vehicle.
Figure 3B:
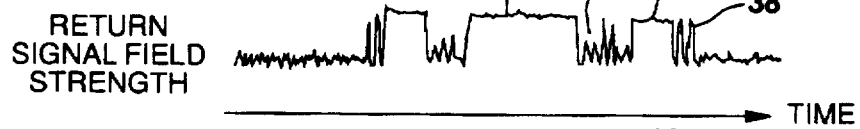
FIGS. 3b, 3c and 3d are signal waveforms produced by the system of FIG. 2 and representing the target vehicle, and implementing the method of the invention.
Figure 3C:
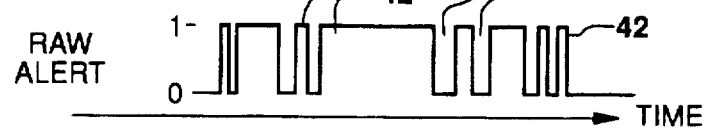
Figure 3D:
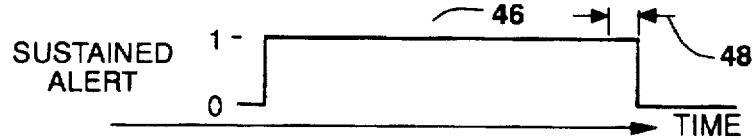

The waveform of FIG. 3b shows a typical radar field strength return signal from a target vehicle 36 in FIG. 3a. The wheel wells and the front and rear edges of the vehicle 36 profile afford weak return signals 38 which often cross below the threshold while the remainder of the vehicle 36 return strong signals 40. The target discrimination algorithms process the signal to issue alert commands 42 shown in FIG. 3c: gaps 44 between the alert commands are dropout events related to the weak field strength portions 38 of the signal. Without a sustaining action the visual or audio alert signal will mimic the alert commands 42. It is preferred that there be no dropout events in the alert signal corresponding to the target vehicle to achieve an uninterrupted or sustained alert signal 46 as shown in FIG. 3d. This is accomplished in most cases by judiciously sustaining each individual alert signal 42 by the process described below. Generally most or all of the gaps 44 are removed and any remaining gaps 44 are minimized by this method which is especially successful at higher relative speeds where the target discrimination algorithm is most effective. At the same time, because of the sustaining effect, the sustained alert signal 46 is longer by a period 48 than the alert command, thereby extending the zone of coverage as perceived by the driver.

Figure 4:
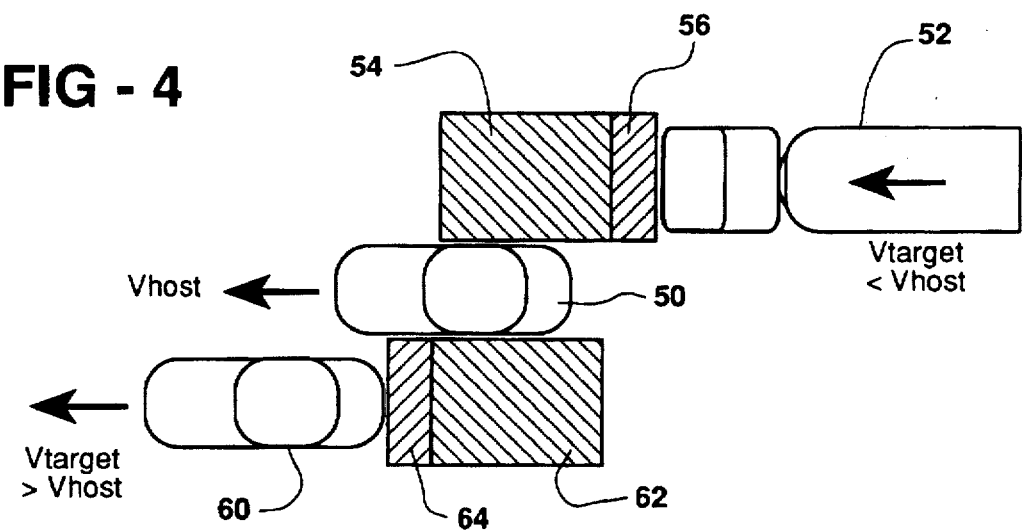
FIG. 4 is a diagram of a host vehicle and target vehicles illustrating actual zones and perceived extensions of radar coverage according to the invention.

The improved coverage is illustrated in FIG. 4 wherein a host vehicle 50 having a speed of Vhost passes a target vehicle 52 having a speed of Vtarget less than Vhost. The radar covers a zone 54 to provide a raw alert signal when the vehicle 52 is still in that zone. Due to the period 48 of the sustained signal, a zone extension 56 is created to to effectively increase the zone of coverage. The amount of extension is determined by the relative speeds of the vehicles and the time period 48. The same effect is produced when the host vehicle 50 is passed by a target vehicle 60 having a speed Vtarget greater than Vhost. Again the zone 62 actually monitored by radar is supplemented by a zone extension 64 due to the sustain period 48. In each case, the driver of the host vehicle has greater assurance that the blind spot is free of an object.

Figure 5:
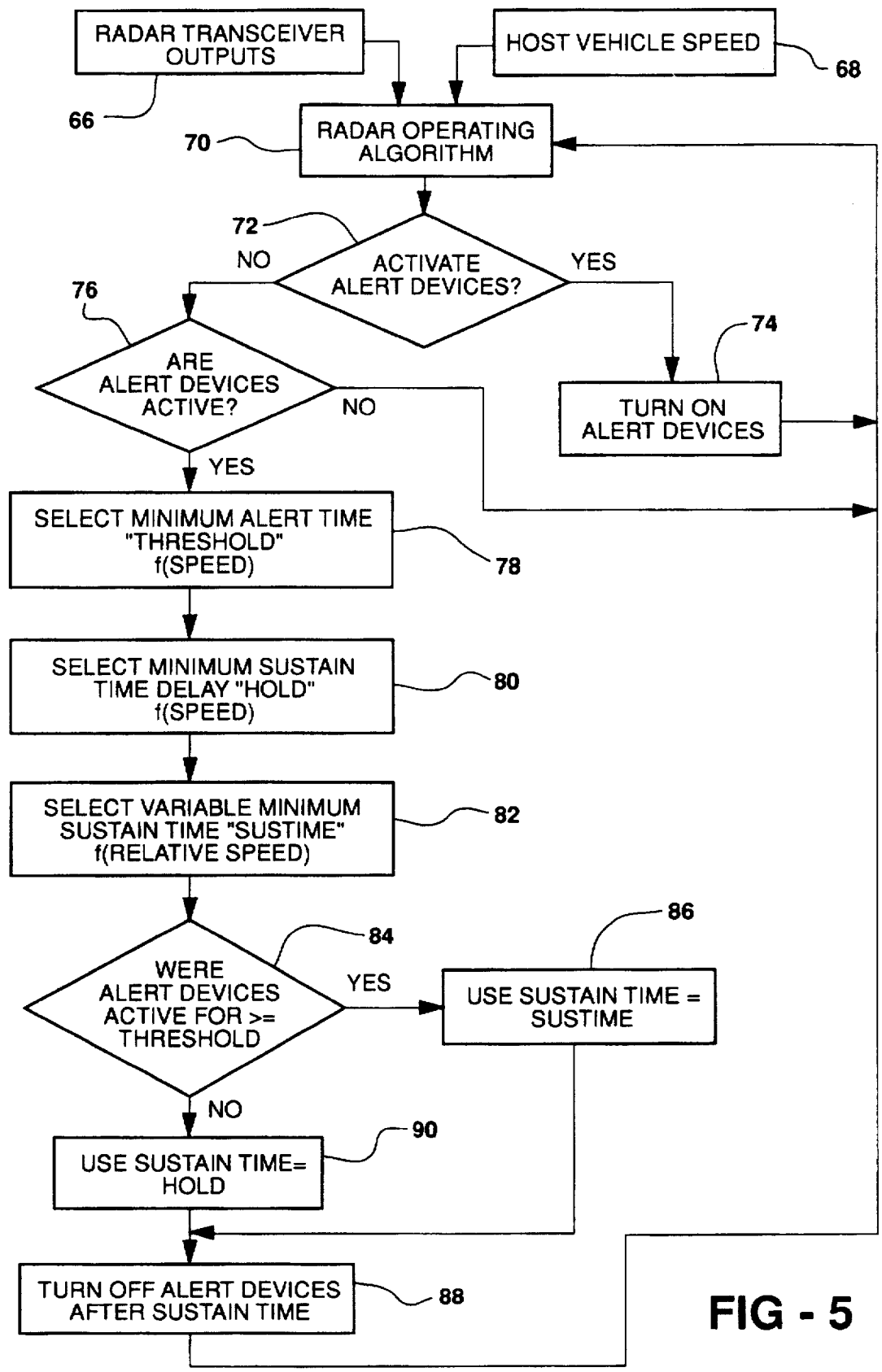
FIG. 5 is a flow chart representing an algorithm for carrying out the invention.

The algorithm for sustaining the alert signal is generally represented by the flow chart of FIG. 5 wherein the functional description of each block in the chart is accompanied by a number in angle brackets <nn> which corresponds to the reference number of the block. It will be understood that the algorithm is repetitively executed, say, one loop once each 20 msec. The radar transceiver outputs <66> and the host vehicle speed signal <68> are input to the signal processor where the radar operation algorithms <70> utilize a target discrimination program to determine whether to activate the alert and issue an alert command accordingly. If an alert command is present <72> the alert devices are turned on <74> and the program returns to the operating algorithm and activation is continued in each loop until the alert command ceases. Then, if the alert device is still active <76> three variables are determined. A minimum alert time threshold "THRESHOLD" is selected as a function of vehicle speed <78>, a minimum sustain time delay "HOLD" is selected as a function of speed <80>, and variable sustain time "SUSTIME" is selected as a function of relative vehicle speeds <82>. If the alerts were active for at least the THRESHOLD time <84>, the SUSTIME value is used to delay alert turn-off <86>, and when SUSTIME expires the alerts are turned off <88>. However if the alerts were active for less than the THRESHOLD time, the alert turn-off is delayed only for the HOLD time <90>. It will be understood that when a sustain time has been selected, it will be decremented in subsequent loops until it expires or until reset by a new alert command.

Figure 6:
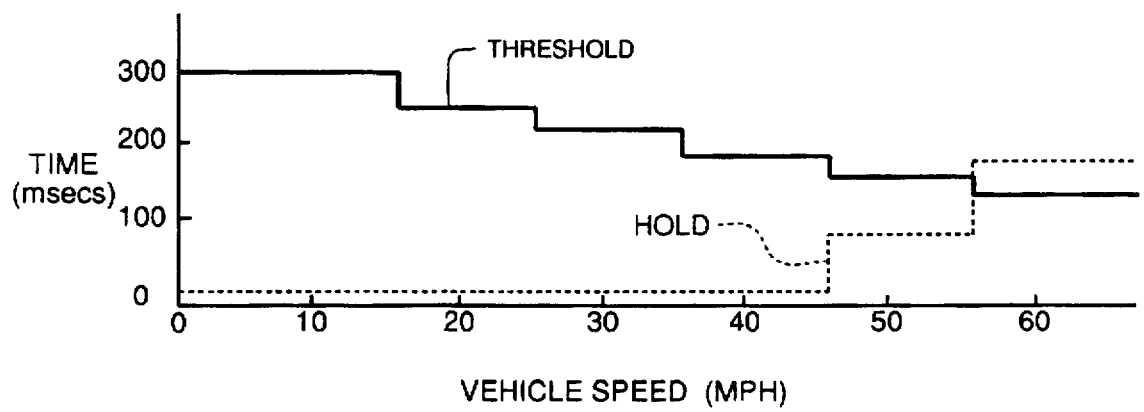
FIG. 6 is a graph showing time thresholds and hold periods as a function of vehicle speed.

The suggested values of THRESHOLD and HOLD times are shown in the graph of FIG. 6. These are calibration values for one application and are useful to illustrate the principle of the alert sustain method. FOR example the THRESHOLD values decrease stepwise from about 300 msec at low speed (below 15 mph) to about 160 msec at high speed (above 55 mph). The THRESHOLD is high at low speeds because the target discrimination is less robust at low speeds and it is desired to not emphasize the shorter alerts since they may be false alarms; at higher speeds the discrimination is more robust and the alerts should be emphasized. Accordingly the HOLD values are only 20 msec from 0 to 45 mph and may optionally be 0 msec; at 45 to 55 mph the HOLD value is 100 msec and at higher speeds it is 200 msec. These values at higher speeds help to mask flickers due to multiple reflections and/or weak signals from the front or rear of a target vehicle and thus to fill in gaps in the alert signal.

Figure 7:
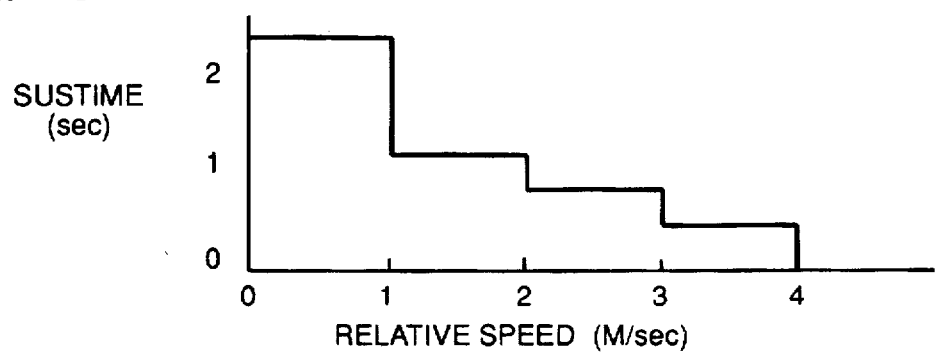
FIG. 7 is a graph of variable sustain time as a function of relative vehicle speed.

The FIG. 7 graph shows suggested values of SUSTIME versus absolute relative vehicle speed. These values vary stepwise from about 2.5 seconds at very low relative speed to about 0.6 seconds at relative speed above 3 meters/sec. These are scaled to allow roughly a 10 foot extension of the zone coverage in each speed range. It will be noted that these times are much larger than the HOLD times, so that the alert duration above the threshold will be greatly extended, the gaps as well as gaps as well as increasing the perceived zone of coverage. Since dropouts are most common during station-keeping events where the relative speed is small, the large SUSTIME values help to overcome the tendency to dropout. The lower SUSTIME values at higher relative velocities are appropriate since at such relative speeds there is usually enough Doppler information to exceed system thresholds.

It will thus be seen that the method of sustaining alert signals beyond that commanded by the radar operating algorithms has the effect of filling in gaps in alert signals to produce, in most cases, a steady alert signal while a target is in view of the radar, and at the same time increases the perceived zone of coverage by extending the length of the alert signal. The alert sustaining method also prevents signal flicker which occurs when a distributed target clears a detection zone.

The embodiments of the invention in which an exclusive property or privilege is claimed are defined as follows:

1. In a radar system wherein a host vehicle uses radar to detect a target vehicle in a blind spot of the host vehicle driver, a method of improving the perceived zone of coverage response of automotive radar comprising the steps of:

determining the relative speed of the host and target vehicles;

selecting a variable sustain time as a function of relative vehicle speed;

detecting target vehicle presence and producing an alert command;

activating an alert signal in response to the alert command;

at the end of the alert command, determining whether the alert signal was active for a threshold time; and if the alert signal was active for the threshold time, sustaining the alert signal for the variable sustain time, wherein the zone of coverage appears to increase according to the variable sustain time.

2. The invention as defined in claim 1 wherein the variable sustain time is an inverse function of the relative vehicle speed.

3. The invention as defined in claim 1 including:

varying the sustain time as an inverse function of the relative vehicle speed in the range of a fraction of a second to a plurality of seconds.

4. The invention as defined in claim 1 including:

varying the sustain time stepwise as an inverse function of the relative vehicle speed for a plurality of relative speed ranges.

5. The invention as defined in claim 4 including:

varying the sustain time sufficiently to extend the perceived zone of coverage about the same amount in each range.

6. The invention as defined in claim 1 including:

determining host vehicle speed; and selecting the threshold time as a function of the host vehicle speed.

7. The invention as defined in claim 1 wherein if the alert signal was active for a period less than the threshold time, sustaining the alert signal for a minimized hold time to minimize driver perception of annoyance alarms.

8. The invention as defined in claim 1 wherein if the alert signal was active for a period less than the threshold time, sustaining the alert signal for a hold time which is a function of host vehicle velocity.

9. The invention as defined in claim 1 including:

determining host vehicle speed;

sustaining the alert signal for a hold time if the alert signal was active for a period less than the threshold time; and varying the hold time and the threshold time as a function of vehicle speed.

10. The invention as defined in claim 9 wherein the hold time increases at high vehicle velocity.

11. The invention as defined in claim 9 wherein the hold time is at or near zero at low vehicle velocity and increases at high vehicle velocity.

12. The invention as defined in claim 9 wherein the hold time is shorter than the variable sustain time.

* * * * *